United States Patent
Zhang et al.

(10) Patent No.: US 7,218,842 B1
(45) Date of Patent: May 15, 2007

(54) EFFICIENT METHODS OF PERFORMING MOTION COMPENSATION BASED DECODING AND RECODING OF COMPRESSED VIDEO BITSTREAMS

(75) Inventors: Ji Zhang, San Jose, CA (US);
Hain-Ching Liu, Fremont, CA (US);
Jiangang Ding, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1565 days.

(21) Appl. No.: 09/915,697

(22) Filed: Jul. 25, 2001

(51) Int. Cl.
*H04N 7/26* (2006.01)
(52) U.S. Cl. .................................. 386/109; 386/112
(58) Field of Classification Search .............. 386/109, 386/111, 112, 27, 33, 45, 46, 124, 125; 348/402.1, 348/403.1, 407.1
See application file for complete search history.

(56) References Cited

U.S. PATENT DOCUMENTS

| | | | |
|---|---|---|---|
| 5,140,437 A * | 8/1992 | Yonemitsu et al. ......... | 386/111 |
| 5,377,051 A * | 12/1994 | Lane et al. ................. | 386/81 |
| 5,812,791 A | 9/1998 | Wasserman et al. | |
| 5,912,676 A | 6/1999 | Malladi et al. | |
| 5,978,509 A | 11/1999 | Nachtergaele et al. | |
| 5,990,958 A | 11/1999 | Bheda et al. | |
| 6,005,624 A | 12/1999 | Vainsencher | |
| 6,028,612 A | 2/2000 | Balakrishnan et al. | |
| 6,084,637 A | 7/2000 | Oku et al. | |
| 6,094,457 A | 7/2000 | Linzer et al. | |
| 6,141,447 A | 10/2000 | Linzer et al. | |
| 6,181,711 B1 | 1/2001 | Zhang et al. | |
| 6,192,083 B1 | 2/2001 | Linzer et al. | |
| 6,385,248 B1 | 5/2002 | Pearlstein et al. | |
| 6,415,056 B1 | 7/2002 | Boon | |
| 6,490,324 B1 | 12/2002 | McDade et al. | |
| 6,618,440 B1 | 9/2003 | Taunton | |
| 6,996,178 B1 | 2/2006 | Zhang et al. | |

OTHER PUBLICATIONS

Ji Zhang and Yi Tong Tse, U.S. Appl. No. 09/766,020, "Methods For Efficient Bandwidth Scaling Of Compressed Video Data", filed Jan. 18, 2001.
ISO/IEP *"Information Technology-Generic Coding Of Moving Pictures And Associated Audio: Systems"*, ISO/IEC 13818-1, Nov. 13, 1994, 135 pages.
ISO/IEP *"Information Technology-Generic Coding Of Moving Pictures And Associated Audio Information: Video"*, ISO/IEC 13818-2, 1995, 209 pages.
ISO/IEP *"Information Technology-Generic Coding Of Moving Pictures And Associated Audio: Audio"*, ISO/IEP 13808-3, Nov. 11, 1994, 104 pages.

* cited by examiner

*Primary Examiner*—Robert Chevalier
(74) *Attorney, Agent, or Firm*—Beyer Weaver LLP

(57) ABSTRACT

The present invention provides efficient methods for performing motion compensation. The methods are particularly useful during motion compensation based decoding and recoding. In one aspect, motion compensation in accordance with the present invention improves on-chip memory usage. This is done by creating and storing a reference window in the on-chip memory. The reference window is constructed such that the reference frame portions required for motion compensation of a current frame are contained within the reference window and in the on-chip memory with a high frequency. In another aspect, selective methods are provided to recode compressed video data. The methods selectively apply re-quantization and motion compensation to the residual error between frames of the bitstream based on the amount of motion in the video data.

38 Claims, 7 Drawing Sheets

EFFICIENT METHODS OF PERFORMING MOTION COMPENSATION BASED DECODING AND RECODING OF COMPRESSED VIDEO BITSTREAMS

BACKGROUND OF THE INVENTION

The present invention relates generally to systems and methods for processing video data. More specifically, the present invention relates to efficient systems and methods for performing motion compensation based decoding and recoding.

Video data is transmitted in a bitstream, or a continuous sequence of binary bits used to digitally represent compressed video, audio or data. The bitstream is transmitted over a transmission channel. One problem with existing transmission channels is their ability to transport video data. In multimedia streaming applications for example, the video data requires significant bandwidth from a communication channel. Since transmission of video data with existing communication channels is often excessive, compression is an approach that has been used to make digital video images more transportable. Digital video compression schemes allow digitized video frames to be represented digitally in much more efficient manner. Compression of digital video makes it practical to transmit the compressed signal using digital channels at a fraction of the bandwidth required to transmit the original signal before compression.

International standards have been created for video compression schemes. These include MPEG-1, MPEG-2, MPEG-4, H.261, H.262, H.263, H.263+, etc. These standardized compression schemes rely on several algorithm schemes such as motion compensation, transform coding (for example, DCT transforms or wavelet/sub-band transforms), quantization of the transform coefficients, and variable length coding (VLC). The motion compensation removes the temporally redundant information between video frame sequences. The transform coding enables orthogonal spatial frequency representation of spatial domain video data. Quantization of the transformed coefficients reduces the number of levels required to represent a given digitized video. The other factor contributing to compression is the use of variable length coding (VLC) so that most frequently used symbols are represented by the shortest code word.

The system that is used to compress digitized video sequence using the above-described schemes is called an encoder or encoding apparatus. Decoding of a bitstream refers to the process of converting compressed video data to a displayable output. Recoding of a compressed video bitstream refers to a process performed on a compressed video bitstream that results in a different bit usage than the originally compressed bitstream, and may include partial or full decoding and re-encoding.

Commonly, transmission of video data is intended for real-time playback. This implies that all of the information required to represent a digital picture must be delivered and displayed in a timely manner. Real time video typically includes more than a thousand of frames per minute. Thus, motion compensation applied during decoding or recoding must be performed quickly. However, motion compensation of compressed video images and data, during decoding or recoding, is generally the most computationally expensive process and represents the bottleneck to decoding and recoding compressed video data.

Motion compensation of an MPEG bitstream includes an iterative process where I, P and B frames are reconstructed using a framestore memory or frame buffers. Motion compensation is typically performed on the reference frame store whose content is the reconstructed image samples from the input compressed bitstream. In most cases, on-chip memory is insufficient to hold the video data for an entire compressed frame. For an HDTV signal, for example, the framestore memory must contain up to 12 MB of memory if an entire frame is used for motion compensation. Thus, the framestore memory or frame buffer is typically an off-chip memory source. Using off-chip memory may dramatically slow down decoding and recoding of compressed video, particularly when the motion compensation must be quickly performed.

Untimely decoding and recoding encountered as a result of off-chip memory delays may undesirably introduce processing delays during transmission and decoding. In a digital video broadcast where thousands of bitstreams are transmitted for example, undesirable processing delays may compromise broadcast transmission.

Therefore, there is a need for efficient methods and systems of performing motion compensation, while minimizing undesirable computational delays.

SUMMARY OF THE INVENTION

The present invention provides efficient methods for performing motion compensation. The methods are particularly useful during motion compensation based decoding and recoding.

In one aspect, the present invention relates to a method for performing motion compensation on a compressed bitstream. The method comprises selecting a portion included in a current frame of the compressed bitstream. The method also comprises obtaining a motion vector for the portion. The method further comprises locating a reference portion in a reference frame identified by the motion vector. The method also comprises performing motion compensation using a first memory source when the reference portion is stored in the first memory source. The method further comprises creating a reference window comprising a set of reference window portions, the set of reference window portions including the reference portion identified by the motion vector. The method further comprises storing the set of reference window portions in the first memory source.

In another aspect, the present invention relates to a method for recoding a compressed bitstream. The method comprises determining a motion index for a frame included in the compressed bitstream. The method also comprises performing motion compensation on data for the frame when the motion index satisfies a motion compensation criteria. The method further comprises performing re-quantization on the data for the frame when the motion index satisfies a re-quantization criteria.

In yet another aspect, the present invention relates to a method for performing motion compensation on an MPEG compressed bitstream. The method comprises selecting a macroblock included in a current frame of the MPEG bitstream. The method also comprises obtaining a motion vector for the macroblock. The method further comprises locating a reference sub-region in a reference frame identified by the motion vector. The method additionally comprises performing motion compensation using a first memory source when the reference sub-region is stored in the first memory source. The method also comprises creating a reference window comprising a set of reference window sub-regions, the set of reference window sub-regions including the reference sub-region identified by the motion vector.

The method further comprises storing the set of window sub-regions portions in the first memory source.

In still another aspect, the present invention relates to a system for performing motion compensation on a compressed bitstream. The system comprises means for selecting a portion included in a current frame of the compressed bitstream. The system also comprises means for obtaining a motion vector for the portion. The system further comprises means for locating a reference portion in a reference frame identified by the motion vector. The system additionally comprises means for performing motion compensation using the first memory source when the reference portion is stored in the first memory source. The system also comprises means for creating a reference window comprising a set of reference window portions, the set of reference window portions including the reference portion identified by the motion vector. The system further comprises means for storing the set of reference window portions in the first memory source.

In another aspect, the present invention relates to a computer readable medium including instructions for performing motion compensation on a compressed bitstream. The instructions comprise instructions for receiving first compressed video data that may be displayed at a low resolution. The instructions also comprise instructions for obtaining a motion vector for the portion. The instructions also comprise instructions for locating a reference portion in a reference frame identified by the motion vector. The instructions further comprise instructions for performing motion compensation using the first memory source when the reference portion is stored in the first memory source. The instructions additionally comprise instructions for creating a reference window comprising a set of reference window portions, the set of reference window portions including the reference portion identified by the motion vector. The instructions also comprise instructions for storing the set of reference window portions in the first memory source.

These and other features and advantages of the present invention will be described in the following description of the invention and associated Figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENTS

Figure 1A:
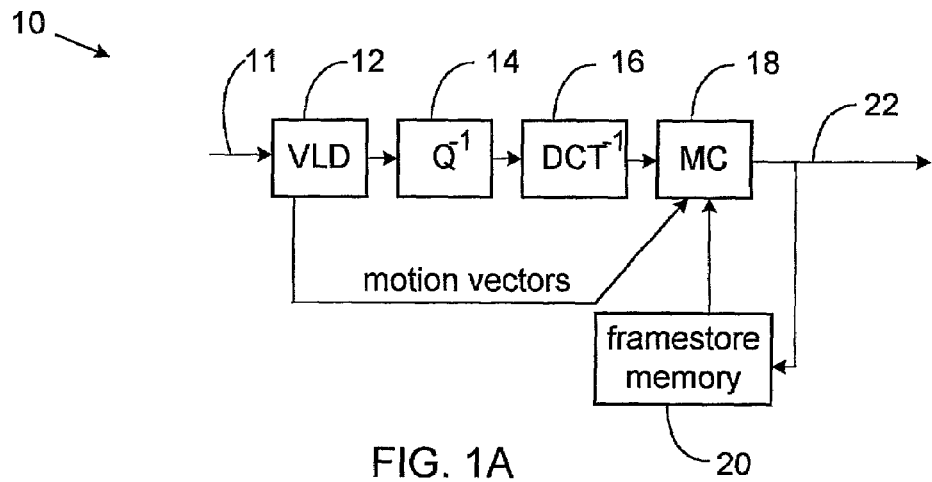
FIG. 1A illustrates a conventional process flow to decode video data.

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In some instances, well known process steps and/or structures have not been described in detail in order to not unnecessarily obscure the present invention.

1. Overview

The present invention provides methods for performing efficient recoding and decoding of video data in a compressed bitstream. In one aspect, motion compensation used during recoding or decoding improves on-chip memory usage. As motion compensation that requires continual off-chip memory transfer may introduce undesirable delays, the present invention improves on-chip memory usage during motion compensation. This is done by creating and storing a reference window in the on-chip memory that includes a set of reference window portions. The reference window is constructed such that the reference window portions are frequently used as the reference portions required for motion compensation, thus minimizing off-chip memory access. In one embodiment, the reference window is constructed according to the processing order of macroblocks in a frame.

In another aspect, flexible methods of recoding are provided. The methods selectively apply re-quantization and motion compensation to frames of a compressed bitstream based on the amount of motion in the video. As will be described in further detail below, human vision generally detects less detail in the presence of greater motion. Correspondingly, more aggressive recoding of residual error in compressed video produces less impact for a viewer in the presence of greater motion. Thus, methods in accordance with one aspect of the present invention selectively apply re-quantization when substantial motion is detected in a frame. The cost in potential video degradation by applying re-quantization is offset by the reduced sensitivity by a viewer, a reduction in bit rate for the video data, and an increase in recoding speed gained by using re-quantization relative to motion compensation.

2. Decoding and Encoding

The present invention describes efficient decoding and recoding methods applied onto compressed bitstreams including video data. Although the remaining discussion will focus primarily on processing of an MPEG-2 bitstream, the present invention is not limited to processing an MPEG bitstream, or any other specific compression format. The methods described herein may be implemented in any public or proprietary compression format including motion compensation as an encoding or re-encoding step. Examples of such compression formats include MPEG-1, MPEG-2, MPEG-4, H.261, H.262, H.263, H.263+, Microsoft streaming format, QuickTime, and RealNetworks.

The MPEG-2 compression standard consists of two layers: a system layer an elementary stream layer. The system layer is defined to allow an MPEG-2 decoder to correctly decode audio and video data, and present the decoded result to the video screen in time continuous manner. The elementary stream layer typically contains the coded video and audio data. It also defines how compressed video (or audio) data are sampled, motion compensated (for video), transform coded, quantized and represented by different variable length coding (VLC) tables.

In the elementary stream, the basic structure for a coded video picture data is a block that comprises an 8 pixel by 8 pixel array. Multiple blocks form a macroblock, which in turn forms part of a slice. A coded picture consists of multiple slices. Multiple coded pictures form a group of pictures. Such hierarchical layering of data structures localizes the most basic processing on the lowest layer, namely blocks and macroblocks. In one embodiment, processing in accordance with the present invention occurs on this lowest level. For example, motion compensation of a compressed MPEG-2 bitstream is a process that occurs on the macroblock level.

The access unit level information relates to coded pictures and may specify whether a picture is an intra frame (I frame), a predicted frame (P frame), or a bi-directional frame (B frame). An I frame contains full picture information. A P frame is constructed using a past I frame or P frame. A bi-directional frame (B frame) is bi-directionally constructed using both a past and a future I or P frame, which are also called anchor frames.

The structure of the MPEG standard is well known to one of skill in the art and described by the MPEG standards. The present invention is suitable for use with the MPEG-1 specification, described in ISO/IEC International Standard 11172; "Coding of moving pictures and associated audio for digital storage media up to about 1.5 Mbits/s", November 1993, which is herein incorporated by reference. The present invention is also suitable for use with the MPEG-2 specification, described in ISO/IEC International Standard 13818; "Generic coding of moving pictures and associated audio information", November 1994, which is herein incorporated by reference. The present invention is also suitable for use with the MPEG-4 specification, described in ISO/IEC International Standard; "Coding of moving pictures and associated audio information", March 2000, which is herein incorporated by reference.

Methods and apparatus of the present invention may be useful during decoding of compressed video data. FIG. 1A illustrates an exemplary process flow 10 to decode video data. The process flow 10 may take place in a network device such as the network device of FIG. 7.

Process flow 10 begins by receiving an MPEG compressed bitstream including video data 11. The video data is decoded using variable length decoding 12, de-quantization 14, inverse transform coding 16 and motion compensation 18. Motion compensation 18 includes an iterative process where I, P and B frames are reconstructed using a framestore memory 20. The result of process flow 10 is de-compressed video data 22.

Figure 1B:
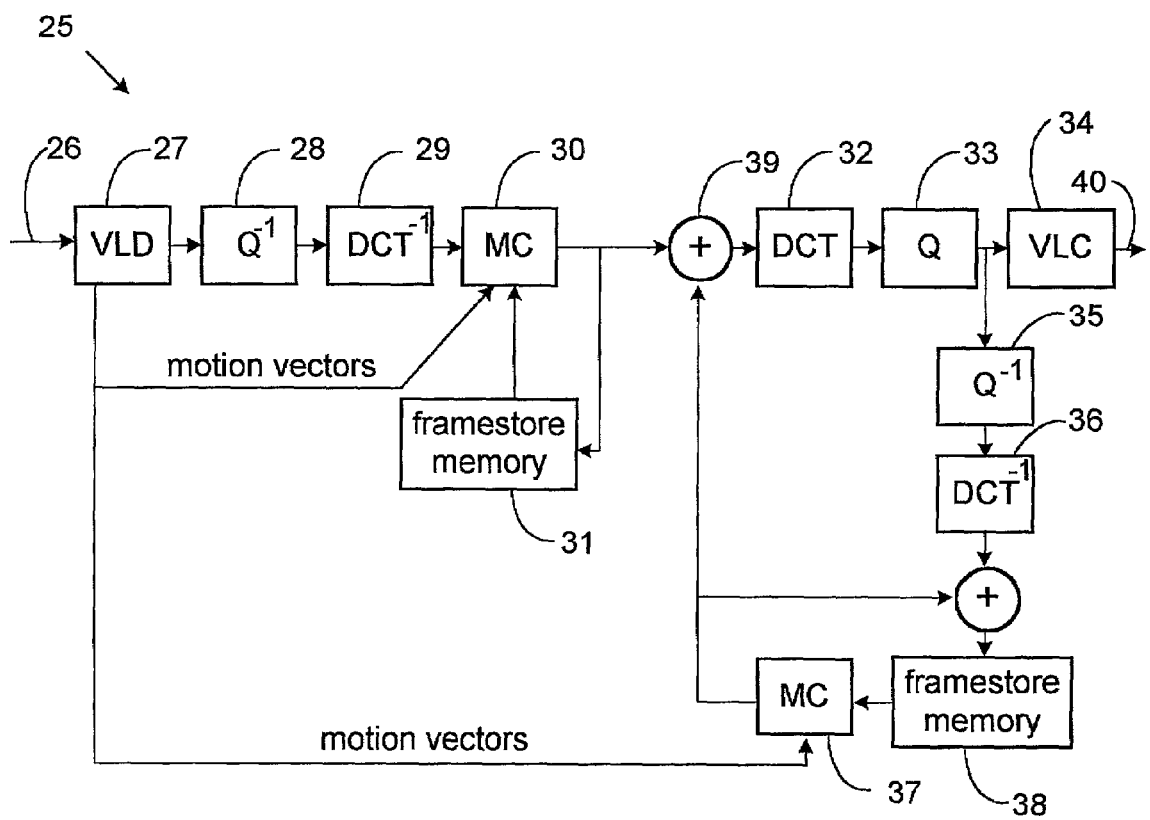
FIG. 1B illustrates an exemplary process flow to recode video data using motion compensation based recoding of the residual error between frames.

FIG. 1B illustrates an exemplary process flow 25 to recode video data using motion compensation based recoding of residual error between frames. The process flow 25 may take place in a network device such as the network device of FIG. 7.

Process flow 25 begins by receiving a compressed bitstream including video data 26. Similar to FIG. 1A, the video data 26 is then decoded using variable length decoding 27, de-quantization 28, inverse transform coding 29 and motion compensation 30 using framestore memory 31. The resulting decoded video data is then re-encoded. Re-encoding includes processing the video data with transform coding 32, re-quantization 33, and VLC encoding 34.

After transform coding 32 and re-quantization 33, each image (full image in the case of I pictures, motion residential in cases of P or B pictures) is reconstructed comprising de-quantization 35 and inverse transform coding 36 before motion compensation 37. Motion compensation 37 includes an iterative process where I, P and B frames are reconstructed using a framestore memory 38. Motion compensation 37 produces a predicted picture that is subtracted 39 with the next decoded picture and residual error sent with the compressed bitstream. The result is then encoded by transform coding 32, re-quantization 33, and VLC encoding 34. The recoded compressed video data 40 may then be transmitted or stored.

Recoding process flow 25 may produce compressed video data 40 having a lower bit rate than received (26). There are numerous bit rate techniques suitable for reducing the bit rate of video data 40. For example, re-quantization 33 may performed with a larger quantization step value. Alternatively, the present invention may perform rate conversion and control by adjusting the resolution of the video data. Resolution alteration of the video data may include complete decoding to a raw video image before encoding back into a compressed bitstream. For example, framestore memory 38 may store images while motion vectors are generated. Resolution conversion according to another bit rate alteration scheme suitable for use with the present invention is described in commonly-owned U.S. patent application Ser. No. 09/608,128, which is incorporated by reference herein for all purposes. Other suitable recoding techniques are described in commonly-owned U.S. Pat. No. 6,181,711 B1, which is incorporated by reference herein for all purposes. In another embodiment, the present invention relates to bit rate alteration methods that use a combination of bit rate alteration techniques.

Although the present invention will now be discussed with respect to several specific recoding (i.e. re-encoding) techniques, the present invention generally applies to any motion compensation, whether performed in an encoder, decoder, or re-encoder. In one embodiment, the methods described herein perform motion compensation using a single framestore that stores the recoding errors.

2. Exemplary Decoding and Encoding Apparatus

Figure 2:
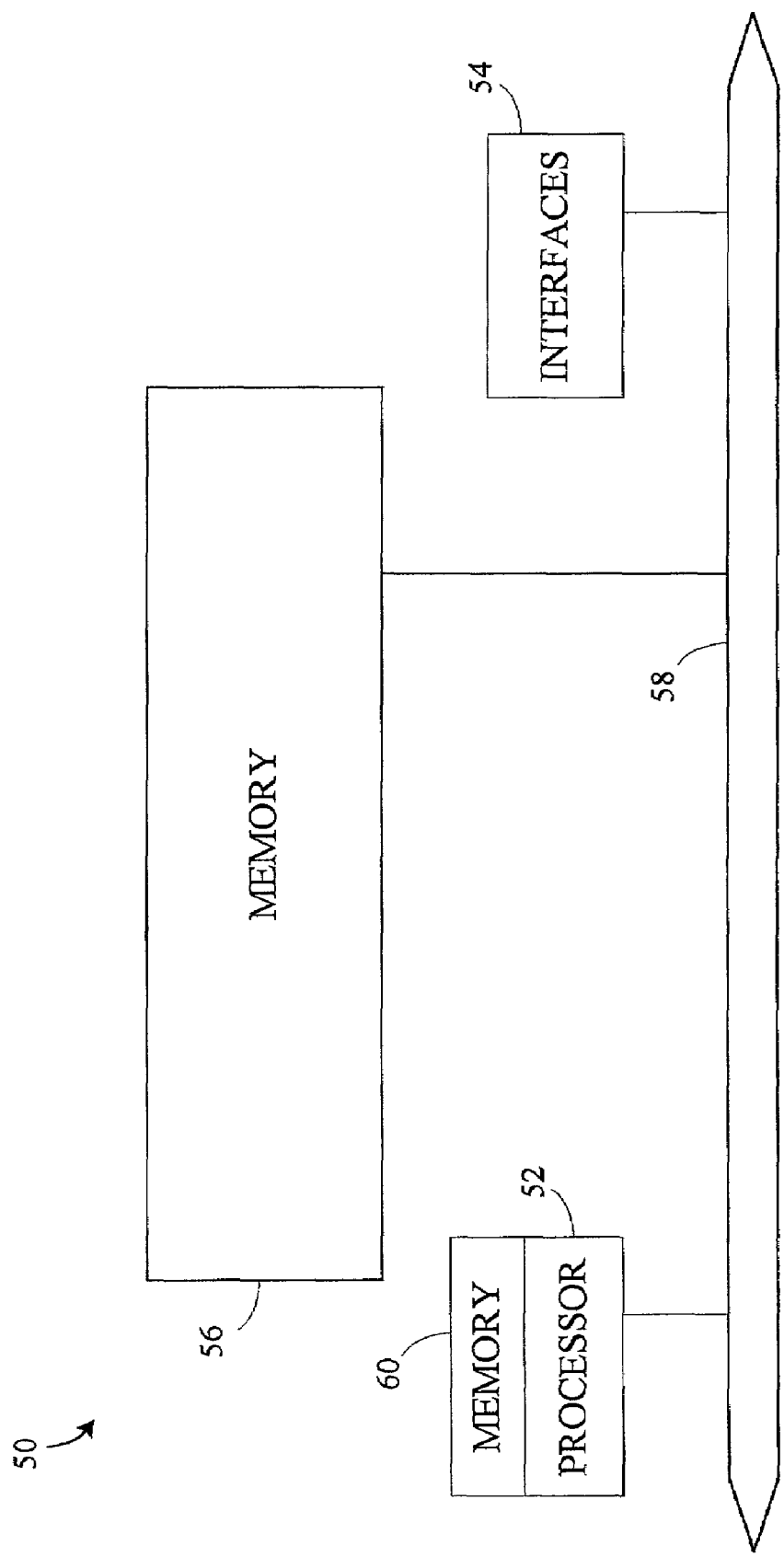
FIG. 2 illustrates a simplified general purpose system to help illustrate certain aspects of the present invention.

Referring now to FIG. 2, a simplified general purpose system 50 is shown to help illustrate one aspect of the present invention. System 50 includes a general architecture for performing motion compensation and comprises a processor (CPU) 52, interfaces 54, memory 56, and a bus 58 (e.g., a PCI bus). Interfaces 54 control the sending and receiving of data packets over a network in communication with system 50 and sometimes support other peripherals used with system 50. A memory 60 (such as non-volatile RAM and/or ROM) also forms part of processor 52. Memory 56 is larger than memory 60 and acts as the main memory for system 50. For the remainder of the present patent application, memory 60 is referred to herein as 'on-chip' memory while memory 56 is referred to herein as the 'off-chip' memory. However, there are many different ways in which memory could be coupled within system 50. Memory 60 may be accessed relatively quickly by processor 52. Conversely, processor 52 communicates with off-chip memory 56 via bus 58, which is relatively slow compared to that of memory 60.

3. Efficient Motion Compensation I

As on-chip memory is often insufficient to store the video data for an entire video frame, and off-chip memory usage is often undesirably slow, methods are provided for performing motion compensation that improve and potentially maximize on-chip memory usage. Motion compensation in this manner may significantly increase the speed of decoding and recoding compressed video.

Figure 3A:
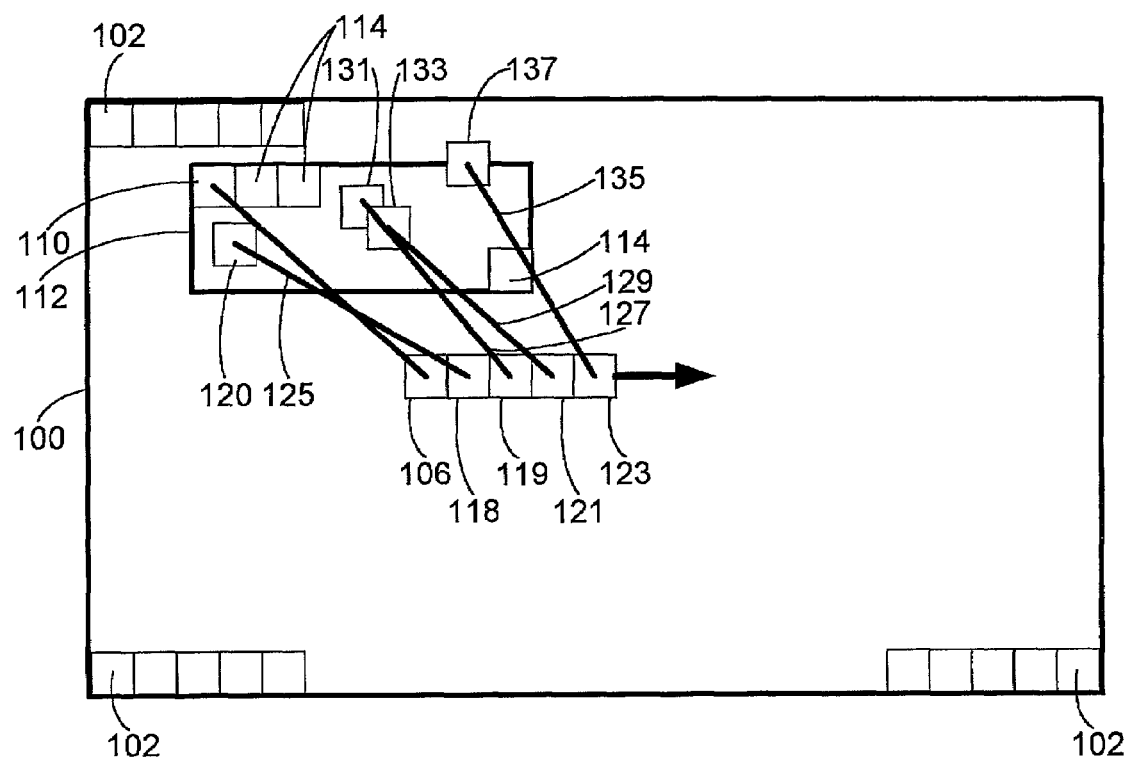
FIG. 3A illustrates a frame being recoded or decoded in accordance with one embodiment of the present invention.

FIG. 3A illustrates a frame 100 being recoded or decoded in accordance with one embodiment of the present invention. Frame 100 is compressed according to MPEG-2 compression and comprises macroblocks 102. Motion compensation of macroblocks 102 typically occurs in raster order. Thus, macroblocks 102 in the upper left corner of frame 100 are the first to be processed. Motion compensation then continues from left to right across frame 100 for each row of macroblocks, and continues in descending rows, finishing with the macroblock 102 in the lower right corner of frame 100.

Motion compensation for macroblocks 102 of frame 100 is a process that uses a motion vector for each macroblock and a reference image sub-region. The motion vector describes the spatial offsets between the macroblock being re-constructed and the reference sub-region. The reference sub-region is located on the reference image frame buffer identified by the motion vector. The reference sub-region has the same dimensions of a referencing macroblock, however, the sub-region typically may not align with the macroblock boundaries in a frame, which are at fixed location for a given image resolution. The reference sub-region includes video data used, together with the motion residual data contained in the macroblock data, in re-constructing a current macroblock being processed. The reference sub-region is typically included in a reference frame. For example, the reference frame may be constructed using data from an I frame and/or P frame, based on the position of frame 100 within a Group of Pictures in the MPEG bitstream. The reference frame is stored in memory and was previously constructed, or in the case of an I frame, contains full picture information. Thus, the reference frame includes the reference sub-region identified by motion vectors of the current macroblock being re-constructed.

As illustrated in FIG. 3A, macroblock 106 is the first of five macroblocks currently being processed in raster order. Motion vector 108 identifies reference sub-region 110 for macroblock 106. Reference sub-region 110 is included in a reference frame previously constructed, and comprises video data used in re-constructing macroblock 106. Reference sub-region 110 also corresponds to the upper left corner of reference window 112.

According to one aspect of the present invention, a reference window 112 is created on the on-chip memory and maintained to improve on-chip memory usage. Reference window 112 is stored in on-chip memory and comprises a set of reference window sub-regions 114, each of which is also stored in on-chip memory. Reference window 112 is a copy of the associated region on the frame buffer 100. The reference window sub-regions 114 each include video data used in re-constructing a current macroblock being processed and were typically included in a stored reference frame. The set of reference window sub-regions 114 included in reference window 112 are configured such that processing of macroblock 106 in frame 100 minimizes off-chip memory access. Thus, as processing continues to macroblocks 118, 119, 121 and 123, on-chip memory access usage is improved. For example, a motion vector 125 for macroblock 118 identifies reference sub-region 120, which is also stored in on-chip memory via reference window 112. Similarly, motion vectors 127 and 129 identify reference window sub-regions 131 and 133 for macroblocks 119 and 121. Reference window sub-regions 131 and 133 are also stored in on-chip memory via reference window 112.

Figure 3B:
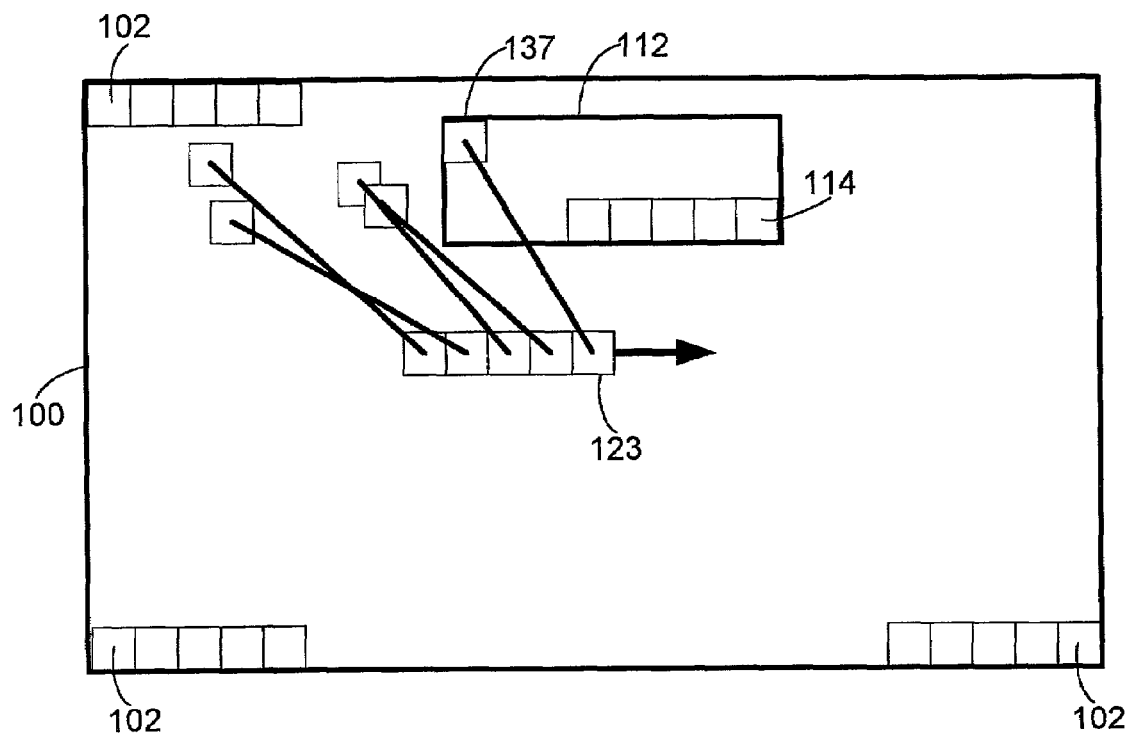
FIG. 3B illustrates the creation of a reference window for the frame of FIG. 3A in accordance with one embodiment of the present invention.

When a motion vector identifies a reference sub-region not contained within reference window 112, the reference sub-region required for motion compensation is stored in an off-chip memory source. For example, a motion vector 135 for macroblock 123 identifies reference sub-region 137, which is not stored in on-chip memory via reference window 112. To continue processing frame 100, reference sub-region 137 is first stored in on-chip memory before performing motion compensation. In addition, a new reference window 112 is re-created using reference sub-region 137 as the upper left reference window sub-region 114 (FIG. 3B). All other reference window sub-regions 114 in reference window 112 are also stored in on-chip memory, according to the construction of reference window 112.

The construction of reference window 112 may vary. For frame 100, reference window 112 is configured according to the raster order processing of macroblocks 102 and an observation that motion vectors are often similar for adjacent macroblocks 102 in a frame. More specifically, reference window 112 includes a relatively large number of reference sub-regions 114 to the right of reference sub-region 110, which corresponds to the current macroblock 106 being processed. Thus, as re-construction of macroblocks 102 continues to macroblocks 118, 119 and 121, the likelihood of encountering a motion vector similar to motion vector 125 is high, and thus the likelihood of encountering a reference sub-region 114 within reference window 112 is high. Reference window 112 also includes several rows of sub-regions 114 below reference sub-region 110. Thus, as re-construction of macroblocks 102 continues in raster order from left to right and downward in rows, the likelihood of using reference window sub-regions 114 is high, and thus the likelihood of encountering a reference sub-region in on-chip memory, or a 'hit', is high.

As shown in FIG. 3A, reference window 112 has a rectangular array of reference portions illustrated by a 3×8 array of reference window sub-regions 114. In one embodiment, reference window 112 comprises between about 4 and 128 reference window sub-regions 114. In a specific embodiment, reference window 112 comprises 128 reference window sub-regions in an 16×8 rectangular array. In this case, reference window 112 covers a 256×128 pixel region of frame 100. In another specific embodiment, reference window 112 comprises 16 reference window sub-regions 114 in an 8×2 rectangular array. In this case, reference window 112 covers a 128×32 pixel region of frame 100.

There is no specific limit to the size of reference window 112. Typically, as number of reference window sub-regions 114 used in reference window 112 increases, the amount of 'hits' also increases. However, this may vary with the type of motion in frame 100. In one embodiment, reference window 112 varies in size according to the resolution of frame 100 and size of frame 100. Indeed, if on-chip memory is sufficient to hold reference macroblocks for the entire frame 100, then the on-chip memory may include video data for the entire reference frame used to construct frame 100. However, processor resources are often limited. In another embodiment, the size of the reference window 112 alters according to the processing demands of the apparatus performing motion compensation.

It is common for a system to have additional computational tasks. For example, a network device may be required to process and transcode anywhere from one to hundreds of bitstreams simultaneously. If only a single bitstream is being processed, the size of reference window 112 may be kept large. When processor resources are shared among additional bitstreams, the amount of on-chip memory available for a single bitstream, and the number of reference sub-regions included in the reference window 112 for that bitstream, becomes limited. Thus, the number of sub-regions used in reference window 112 may vary with processing conditions. In this case, the amount of on-chip memory allocated for a bitstream being processed and the size of its corresponding reference window 112 decreases for each additional bitstream being processed. In a specific embodiment, the size of reference window 112 decreases when a second compressed bitstream is being re-coded with requantization-only based recoding. In another specific embodiment, the size of reference window 112 decreases when a second compressed bitstream is being re-coded with motion compensation based recoding.

In one embodiment to improve on-chip memory usage, the number of sub-regions used in reference window 112 varies over time. In a specific embodiment, the number of reference window sub-regions 114 used in reference window 112 varies with the hit rate of motion vectors within reference window 112. For example, if the hit rate is low for a given frame, the number of reference window sub-regions 114 increases to improve on-chip memory usage. In a specific embodiment, the number of reference window sub-regions 114 included in reference window 112 changes with the amount and type of motion within frame 100. Motion vectors that continually identify reference sub-regions outside of reference window 112 may lead to continue re-creation of the reference window 112. To improve on-chip memory usage in this case, the number of reference sub-regions included in reference window 112 increases. This may be the case for video consistently having motion from different parts of a reference frame, for example.

In another specific embodiment, the number of reference sub-regions included in reference window 112 decreases with the amount and type of motion within frame 100. As mentioned above, motion vectors that continually identify reference sub-regions outside of reference window 112 may lead to continue recreation of the reference window 112. In some cases as just described, it may be beneficial to enlarge reference window 112. In other cases however, expanding reference window 112 may result in minimal improved performance. This may be the case for output video having considerable random motion from different portions of the reference frame. Thus, it is sometimes desirable to reduce the number of reference window sub-regions 114 included in reference window 112 when the added performance of a larger reference window 112 is minimal.

In addition, the size of the reference window 112 may be reduced after motion compensation is performed for a large number of reference sub-regions all consecutively located within reference window 112. In other words, when the on-chip memory is continually being used, the number of reference window sub-regions 114 included in reference window 112 may decrease. This may be beneficial for consistent or minimal motion. Size alteration of reference window 112 may then vary with frame 100 processing. For example, if the number of reference sub-regions 114 within reference window 112 increased as a result of continual off-chip memory usage, the number of reference sub-regions 114 may subsequently be decreased when a large number of reference sub-regions are all consecutively located within reference window 112. In this manner, reference window is altered continually and on-chip memory usage is maximized flexibly according to the amount and type of motion within frame 100.

Figure 4:
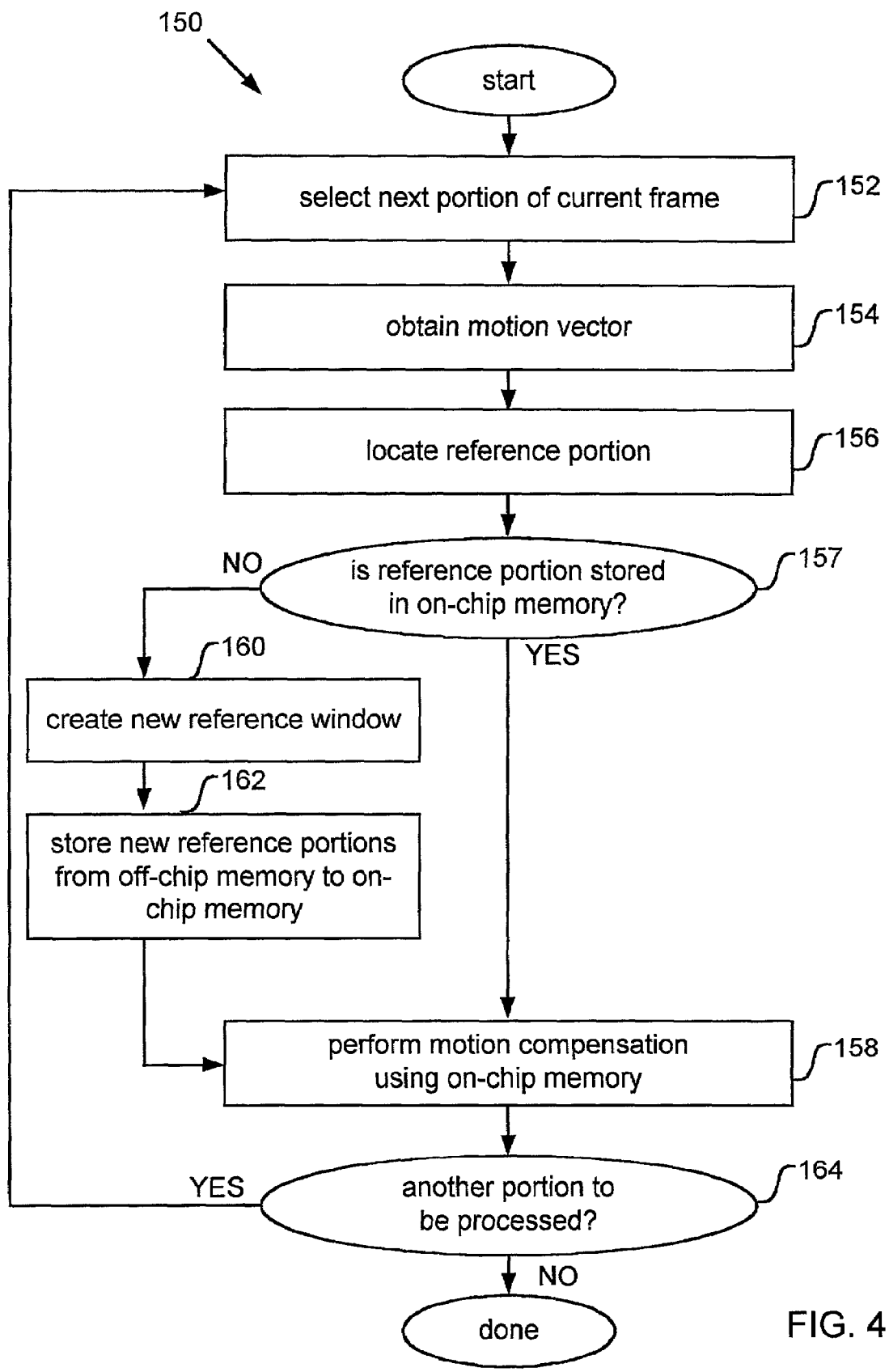
FIG. 4 illustrates a process flow for performing motion compensation on a frame included in a compressed bitstream in accordance with one embodiment of the present invention.

FIG. 4 illustrates a process flow 150 for performing motion compensation on a frame included in a compressed bitstream in accordance with one embodiment of the present invention. In one embodiment, the motion compensation is performed on the reference frame store whose content is the reconstructed image samples from the input compressed bitstreams. The process flow 150 may take place in any network device such as the network device 700 of FIG. 7. Processes in accordance with the present invention may include up to several additional steps not described or illustrated here in order not to obscure the present invention. While compressed video bitstream processing will now be described as a method, those skilled in the area will recognize that the present invention encompasses a system or software having units capable of performing the actions as described below.

For a current frame being processed, process flow 150 begins by selecting a portion of the frame (152). In one embodiment, the bitstream is compressed according to an MPEG standard, the portion corresponds to a macroblock included in a frame, and macroblocks in the frame are selected for processing according to raster order.

A motion vector is then obtained for the portion being constructed (154). For an MPEG bitstream, the motion vectors are decoded from their location in the compressed bitstream. The motion vectors are coded as variable length codes embedded at the macroblock data level, just before the macroblock mode and transform coefficient data portion. The motion vector identifies a reference sub-region or portion from a reference frame that contains video data used in motion compensation for the current frame portion being processed. This reference portion is then located using the motion vector (156) The referenced sub-region is located by first decoding the motion vectors associated with the macroblock being processed, then taking an offset using the decoded motion vectors from the current macroblock location. If the reference portion is stored in on-chip memory, motion compensation is then performed on the portion using the data contained in the on-chip memory (158), and process flow 150 selects the next portion of the frame to be processed (164 and 152).

If data for the reference portion is stored in off-chip memory (157), then a new reference window is created (60). The new reference window comprises the reference portion stored in off-chip memory and any other reference window portions according to the current reference window construction. The reference window portions constituting the new reference window are then stored in the on-chip memory (162). Motion compensation is performed on the portion using the data contained in on-chip memory (158) and process flow 150 selects the next portion of the frame to be processed (164 and 152). If there are no more portions of the current frame to be processed (164), then processing for the current frame is finished.

For processing systems using on-chip and off-chip memory sources, the efficient motion compensation methods described above may result in significant savings in processing time, depending on the size of reference window 112 and the amount and complexity of motion in the video data. Alternatively, these efficient motion compensation methods may reduce bus usage between a processor and off-chip memory, freeing the bus for other system uses. For systems required to process multiple bitstreams, reduced processing time for recoding a single bitstream may allow additional video bitstreams to be recoded.

Although the present invention has primarily been described so far with respect to the first memory referring to a on-chip memory source and the second memory referring to a off-chip memory source, the first and second memory sources generally refers to any to memory sources in which the second memory source has a slower access and/or processing time than the first memory source. For example, the first memory may refer to memory included in a separate chip within the same package as the processing chip, while the second memory source is separated from the processor by a PCI bus. Here, the time savings in using the first memory is the time required, but not used, in using the PCI bus that connects the processor to the second memory for each memory access required in motion compensation. Alternatively, multiple caches each designated with a different level according to speed or accessibility may be implemented in a processing system. In this case, a faster or more accessible cache may be used as the first memory source while a larger and/or slower secondary or tertiary cache is used as the secondary memory.

4. Efficient Motion Compensation II

In another aspect, the present invention relates to efficient methods of motion compensation that selectively recode a compressed video bitstream based on the amount of motion in the video data.

This aspect of the present invention benefits from inventor observation that human visual processing is a limited system. More specifically, human visual processing relies on several information reduction features and trade-offs for managing the excessive amount of visual information to be processed at any given time. One such trade-off is that human vision generally perceives less detail in the presence of a large amount of motion. This aspect of human visual processing may be used to facilitate recoding of compressed bitstreams. That is, the impact for a viewer due to more aggressive recoding operations that produce reduced detail in the output video data is less pronounced when the video data contains increased motion.

Thus, based on the amount of motion in the video data, methods in accordance with one aspect of the present invention selectively apply different recoding schemes, each having different visual costs and different recoding benefits, based on the amount of motion in video data being processed.

The recoding schemes differ in computational complexity and produce varying video quality. Typically, there is a trade-off between computational complexity and video quality. In one embodiment, the present invention selectively applies re-quantization and motion compensation to video data based on the amount of motion in video data. This selective recoding is applied to the residual errors between frames. The motion compensation based recoding maintains the video quality of the residual error between frames by completely de-coding and summing the error with the previous picture (see 37 and 39 of FIG. 1B). The re-quantization based recoding is less sensitive to the residual error between frames and may introduce minimal error to the video data. However, as mentioned above, if there is substantial amount of motion in the video data, the minimal error introduced by performing re-quantization may not significantly impact viewer reception of the video data.

In a specific embodiment, the motion between frames determines the amount of motion for selective recoding. In the presence of minimal motion between frames, motion compensation is applied to the recoding error between frames, thus maintaining video quality that can be perceived by a viewer. In the presence of substantial motion between frames, re-quantization is applied to the recoding error between frames. This approach may affect video quality for frames that include substantial recoding error between frames. However, the degradation in video quality by applying re-quantization is offset by the reduced ability of the viewer to perceive detail in the presence of substantial motion.

An advantage of performing re-quantization as described is that the re-quantization decreases processing time for recoding video data. As mentioned before, it is common for a system to process multiple bitstreams at a single time. When processor resources are shared among multiple bitstreams, less costly recoding schemes may reduce the time to recode a single bitstream or may allow more bitstreams to be processed by a single processing system.

Figure 5:
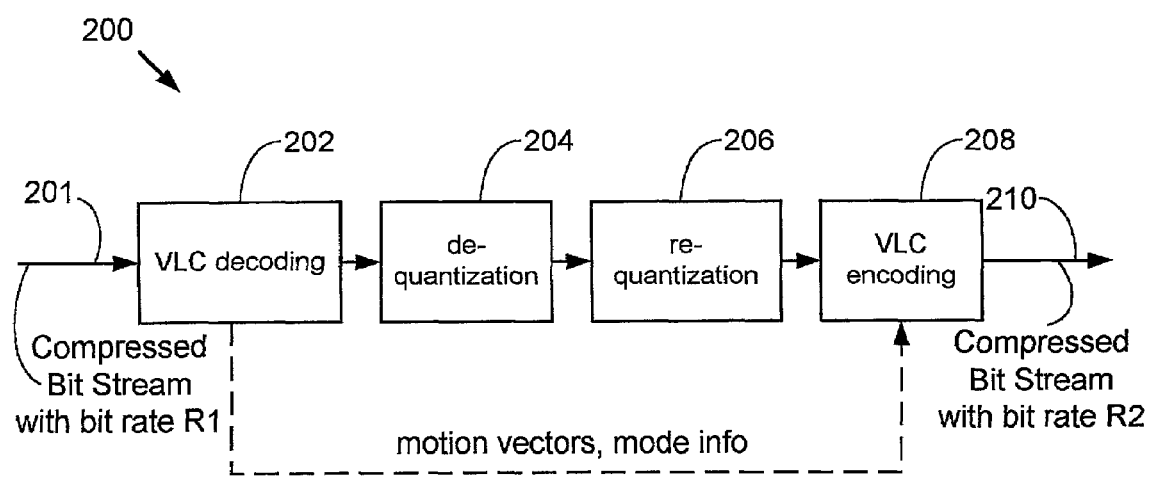
FIG. 5 illustrates a process flow for basic re-quantization suitable for recoding video data according to one embodiment of the present invention.

FIG. 5 illustrates basic re-quantization 200 suitable for recoding video data according to one embodiment of the present invention. Basic re-quantization 200 begins by receiving a compressed video data 201. Video data 201 is partially decoded using VLC decoding 202 and de-quantization 204. Video data 201 is then re-encoded. As the term is used herein, re-encoding refers to the process of performing at least partial decoding and subsequent encoding on a compressed bitstream. Re-encoding then comprises re-quantization 206 and VLC encoding 208. The motion vectors and mode info are then encoded back into the compressed domain for transmission (210).

In one embodiment, the present invention also performs rate control. Basic re-quantization 200 alters the bit usage for the video data and performs rate control by adjusting the quantization step size of video data in the video stream. For bit rate reduction of the video data, re-quantization 206 is performed with a larger quantization step value relative to that when received (201). As one of skill in the art will appreciate, the exact quantization step value will depend on a number of factors such as the channel capacity that the data is being transmitted onto, bit rate reduction ratio, picture type, original quantization step size, video resolution, picture statistics including complexity, scene change, brightness, etc.

FIG. 1B illustrates a suitable process flow 25 for motion compensation based recoding in the presence of minimal motion between frames. Motion compensation based recoding may also include the on-chip efficiency methods described above with respect to FIGS. 3 and 4. There are many other suitable methods for performing motion compensation based recoding. Other suitable examples are provided in commonly owned U.S. patent application Ser. No. 09/766,020, which is incorporated herein for all purposes. In one embodiment, the present invention may also perform rate control by adjusting the resolution of video data in the compressed bitstream. Resolution alteration of the video data typically requires complete decoding to a raw video image before encoding back into a compressed bitstream.

In accordance with one embodiment of the present invention, motion between frames is quantified in order to provided a frame by frame analysis of the amount of motion. In a specific embodiment, a motion index is used to determine when to perform motion compensation and when to perform re-quantization. The motion index is a construct that comprises information relating to the amount of motion in a frame or between two successive frames. The motion index may include motion information relating to, for example, fast motion and/or random motion over a number of frames.

In a specific embodiment suitable for use with an MPEG compressed bitstream, the motion index uses an inner product of the motion vectors generated from two adjacent macroblocks. In terms of motion vectors, fast motion translates into an inner product of large magnitude, while random motion translates into inconsistent inner products of varying magnitude and direction. A composite of inner products generated from multiple macroblocks within a frame may then be used to determine a motion index for the entire frame. For example, motion vectors generated from adjacent macroblocks throughout an entire frame may be summed to generate a composite motion index for the frame. The decision to perform motion compensation based or re-quantization based re-encoding may then be made on a frame by frame basis by analyzing the motion index for each frame.

Using the motion index, criteria can then be established in order to determine when to perform motion compensation or when to perform re-quantization on the video data. In a specific embodiment, a motion compensation criteria is established that takes into account the amount of fast motion in a frame. As mentioned, when using a motion index determined with an inner product of two adjacent motion vectors, fast motion will produce an inner product with a large magnitude. When the inner products are summed over an entire frame, fast motion will produce a composite motion index with a large magnitude for the entire frame. Thus, a motion compensation criteria that indicates when motion compensation based recoding should be performed may be set according to a specific motion index threshold. Motion compensation is then performed when the composite motion index for a frame is less than the motion index threshold for fast motion. In other words, when there is less than a predetermined level of motion in the frame, motion compensation based recoding is performed (FIG. 2A). When the composite motion index for a frame is greater than the motion index threshold for fast motion, re-quantization is used.

A re-quantization criteria may also established to determine when to use re-quantization in recoding the residual error between frames. In a specific embodiment, the re-quantization criteria takes into account the amount of random motion in a frame. As mentioned, when using a motion index determined using an inner product of two adjacent motion vectors, motion vectors pointing in opposite directions will produce an inner product with a large negative value. Taken over an entire frame, random motion and inconsistent motion vectors will produce numerous inner products of varying positive and negative magnitudes. Upon summing the inner products of adjacent motion vectors over an entire frame, the sum for random motion may be not be unusual since the positive and negative values will cancel. However, the absolute sum of the inner products of adjacent motion vectors over an entire frame will be relatively large, and these two pieces of information may be used together to detect and quantify the random motion. Thus, a re-quantization criteria that indicates when re-quantization based recoding should be performed may be set according to a specific motion index thresholds relating to sums and absolute sums of inner products. The re-quantization criteria then includes motion index thresholds that indicate the amount of random motion in a frame. Re-quantization and motion compensation are then performed accordingly based on the motion index thresholds for random motion.

In some implementation, such as DSP, the inner product is computationally more expensive than, say, the absolution sum and arithmetic sum. Mathematically, the inner product sum is a second order measure and absolute and arithmetic sum are first order measures. Any of these measures can be used to detect the amount of random vs. uniform motion vectors, with the second order measures emphasizing larger motion vectors. Therefore, the above method can also be applied to the first order measures.

The motion index and amount of motion in the video data may also be used to quantitatively affect recoding. More specifically, the motion index may be used to affect the re-quantization step size. As described above, re-quantization 206 is performed with a larger quantization step value relative to that encountered in the video data when received for bit rate reduction of the video data. In a specific embodiment, the re-quantization step size increases with a larger motion index. For example, an exemplary formula suitable for use with the present invention is:

New quant step size=old quant step size+adjust factor where,

Adjust factor=constant×(1+motion_index)

where motion_index is a number between 0 and 1 with 1 representing the most amount of random motion.

Figure 6:
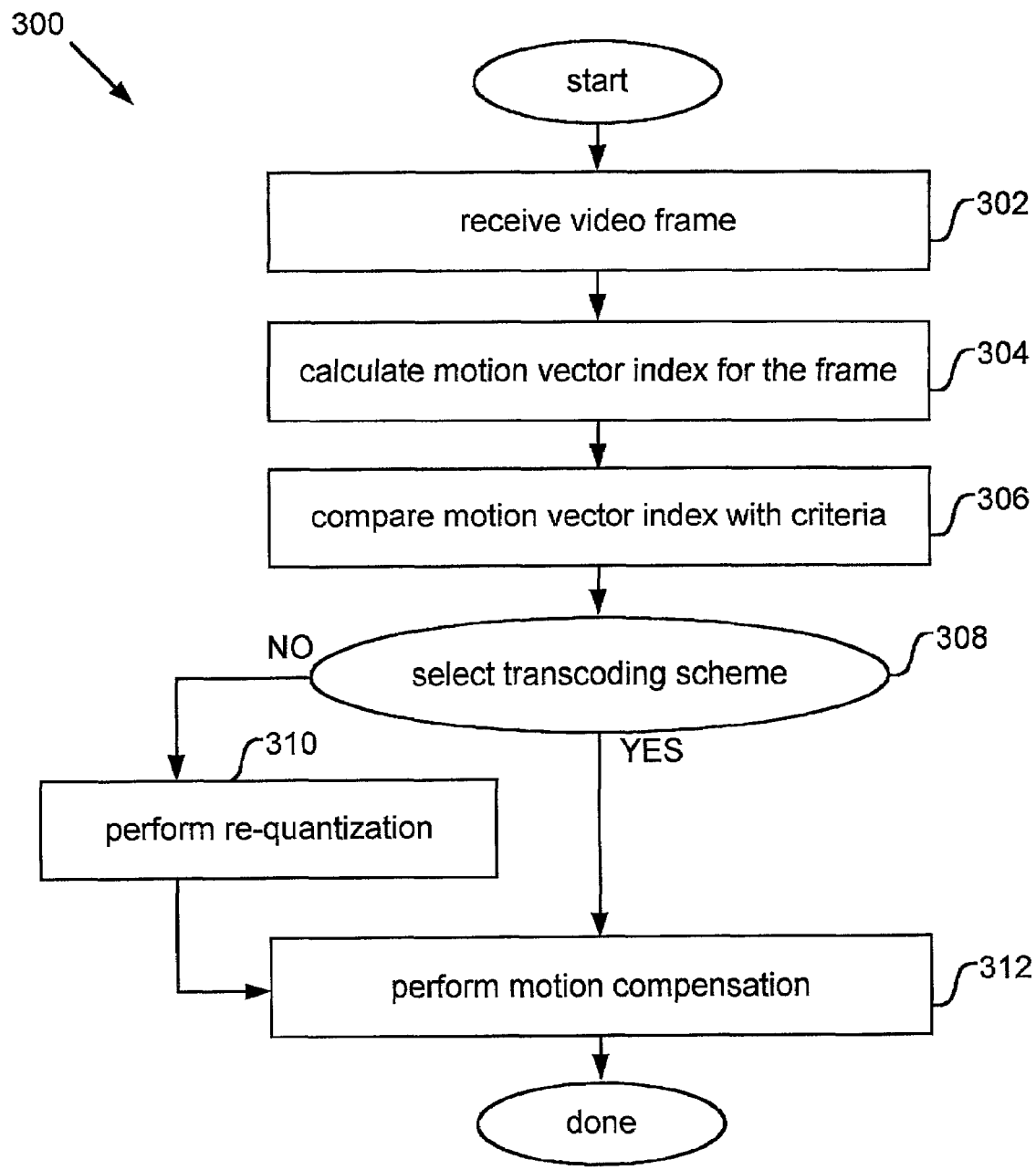
FIG. 6 illustrates a process flow for recoding a frame included in a compressed bitstream in accordance with one embodiment of the present invention.

FIG. 6 illustrates a process flow 300 for recoding a frame included in a compressed bitstream in accordance with one embodiment of the present invention. Process flow 300 may take place in any network device such as the network device 700 of FIG. 7. Processes in accordance with the present invention may include up to several additional steps not described or illustrated here in order not to obscure the present invention. While compressed video bitstream transmission will now be described as a method, those skilled in the area will recognize that the present invention encompasses a system or software having units capable of performing the actions as described below. Process flow 300 is also well-suited to modify the bit rate of a compressed bitstream to use an available bandwidth of the channel.

Process flow 300 begins by receiving a video frame included in an MPEG compressed bitstream (302). A motion index is then determined for the frame (304). The motion index quantifies the amount of motion in the frame relative to a previous reference frame. This may include a composite of inner products generated from motion vectors within the frame. The motion index for the frame is compared with one or more motion index criteria that determine which recoding scheme is to be used. Based on this comparison, one of the available recoding schemes is then selected (308). In one embodiment, re-quantization is used to recode the residual error when there is substantial motion in the frame (310) and motion compensation is used to recode the residual error when there is minimal motion in the frame (312).

Generally, the efficient motion compensation techniques of the present invention may be implemented on software and/or hardware. In a specific embodiment of this invention, the technique of the present invention may be implemented in software such as an operating system or in an application running on an operating system. A software or software/hardware hybrid system of this invention is preferably implemented on a general-purpose programmable machine. Such a programmable machine may be a network device designed to handle network traffic. Such network devices typically have multiple network interfaces. One important class of device that may be used to implement the present invention is the Cable Modem Termination System.

Figure 7:
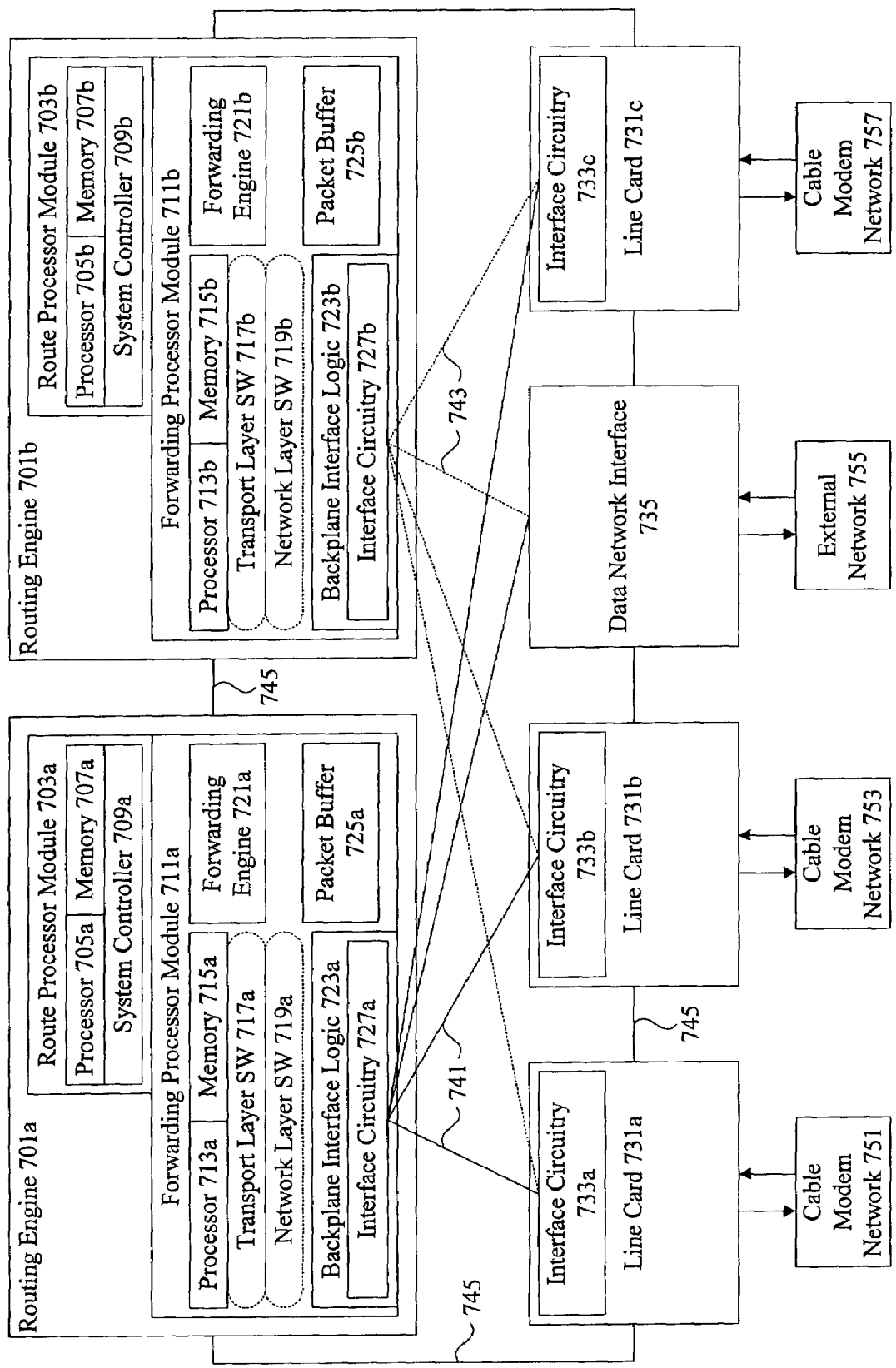
FIG. 7 shows a block diagram of a specific embodiment of a Cable Modem Termination System (CMTS) which may be used to implement certain aspects of the present invention.

FIG. 7 shows a block diagram of a specific embodiment of a Cable Modem Termination System (CMTS) 700 which may be used to implement certain aspects of the present invention. As shown in FIG. 7, the CMTS 700 may comprise a plurality of routing engines (e.g. 701a, 701b).

Each of the routing engines may include a variety of similar modules and/or components. According to a specific embodiment, Routing Engine A may be configured or designed to include a plurality of functionally different modules or components, including, for example, a Forwarding Processor (FP) Module 711a adapted to provide packet forwarding functionality; a Route Processor (RP) Module 703a adapted to implement routing or forwarding operations; a utility component 702a adapted to provide system clock and timestamp functionality; etc. The routing engine components provide may be configured to provide layer one, layer two, layer three and layer four functionality as well as quality of service (QoS) functionality.

According to a specific implementation, the RP Module 703a may be configured as a processor-based routing system comprising functionality incorporated within a typical router, such as, for example, specially configured router models 1600, 2500, 2600, 3600, 4500, 4700, 7200, 7500, 10012, and 12000 available from Cisco Systems, Inc. of San Jose, Calif. For example, as shown in the embodiment of FIG. 7, the RP Module 703a comprises a general-purpose processor 705a (e.g., a MIPS route processor) coupled to a system controller 709a and memory 707a.

The memory 707a may comprise synchronous dynamic random access memory (SDRAM) storage locations addressable by the processor 705a for storing software programs, video data, and data structures accessed by the components. A network routing operating system, portions of which may reside in memory and executed by the route processor, functionally organizes the router by invoking network operations in support of software processes executing on the router.

The RP processor 705a may be configured to construct and load routing tables used by the FP Module 711a. The processor 705a may also be configured or designed to perform configuration management functions of the routing engine 701a, and to communicate with neighboring peer, standby, and/or backup routers to exchange protocol data units used to construct the routing tables in accordance with conventional routing algorithms. It will be apparent to those skilled in the art that other memory types, including various computer readable media, may be used for storing and executing program instructions pertaining to the operation of the routing engine.

Interface circuitry 727a may be coupled to the respective interface circuitry 733a, 733b of line cards 731a, 731b. According to various embodiments, the FP Module 711 may comprise a processor 713a and memory 715a for handling transport layer 717 and network layer 719 functionality. The FP Module 711a may also be configured to provide transaction compacting functionality, data parcel tunneling functionality, video data transmission functionality, etc.

According to different embodiments of the present invention, one or more of the routing engines may be configured to communicate with a plurality of line cards (e.g. 731, 735) via point-to-point links. For example, as shown in FIG. 7, each of the plurality of line cards 731 and 735 are connected to each of the routing engines 701a, 701b via point-to-point links 741 and 743. One advantage of the point-to-point link configuration is that it provides additional reliability in that the failure of one or more line cards will not interfere with communications between other line cards and the routing engine(s). For example, if Line Card A 731a suddenly failed, each of the routing engines would still be able to communicate with the other line cards.

The efficient motion compensation techniques of the present invention may be implemented on various general purpose Cable Modem Termination Systems. In a specific embodiment, the systems of this invention may be specially configured CMTSs such as, for example, specially configured models in the uBR-7200 and uBR-10012 series of CMTSs available from Cisco Systems, Inc. of San Jose, Calif. In an alternative embodiment, the methods of this invention may be implemented on a general-purpose network host machine such as a personal computer or workstation. Further, the invention may be at least partially implemented on a card (e.g., an interface card) for a network device or a general-purpose computing device.

Regardless of network device's configuration, it may employ one or more memories or memory modules (e.g., memory 707a, 715a, etc.) configured to store video data, program instructions for the network operations and other functions of the present invention described herein. The program instructions may specify an operating system and one or more applications, for example. Such memory or memories may also be configured to store data structures, video data, or other specific non-program information described herein.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

While the discussion to this point has focused on efficient motion compensation techniques for cable networks, the technology of the present invention may be applied to any access or shared-access network having a plurality of hosts or nodes which share at least one channel for communicating with at least one "Head End" in the network. Examples of shared-access networks include, in addition to cable networks, wireless networks, Ethernet, FastEthernet, GigabitEthernet, LANs, etc. In the cable network, the plurality of nodes represents a plurality of cable modems that communicate with at least one CMTS at the centralized termination system using at least one shared-access upstream and downstream channel.

In general, the methods and apparatus described above may be implemented on a traffic handling device (e.g., a switch or router) for providing efficient motion compensation capability in a network having at least one traffic handling device (e.g., another switch or router) that provides normal service to a host.

While this invention has been described in terms of several preferred embodiments, there are alterations, permutations, and equivalents which fall within the scope of this invention which have been omitted for brevity's sake. It is therefore intended that the scope of the invention should be determined with reference to the appended claims.

What is claimed is:

1. A method for performing motion compensation on a compressed bitstream, the method comprising:
   selecting a portion included in a current frame of the compressed bitstream;
   obtaining a motion vector for the portion;
   locating a reference portion in a reference frame identified by the motion vector;
   performing motion compensation using a first memory source when the reference portion is stored in the first memory source;
   creating a reference window comprising a set of reference window portions, the set of reference window portions including the reference portion identified by the motion vector; and
   storing the set of reference window portions in the first memory source.

2. The method of claim 1 wherein the first memory source is an on-chip memory source.

3. The method of claim 1 further comprising re-creating the reference window when the reference region was stored in a second memory source.

4. The method of claim 1 wherein the second memory source is an off-chip memory source.

5. The method of claim 1 further comprising altering the reference window after motion compensation is performed.

6. The method of claim 5 wherein altering the reference window comprises changing the number of reference window portions included in the set of reference window portions.

7. The method of claim 6 wherein changing the number of reference window portions comprises increasing the number of reference window portions included in the set of reference window portions when the reference region is not stored in the first memory source.

8. The method of claim 6 wherein changing the number of reference window portions comprises decreasing the number of reference window portions included in the set of reference window portions when the reference region is stored in the first memory source.

9. The method of claim 6 wherein changing the number of reference window portions comprises decreasing the number of reference window portions included in the set of reference window portions when a network device required to perform the motion compensation is required to perform motion additional computational tasks.

10. The method of claim 9 wherein the additional computation tasks include requantization-only based recoding of a second compressed bitstream.

11. The method of claim 9 wherein the additional computation tasks include motion compensation based recoding of a second compressed bitstream.

12. The method of claim 1 wherein the reference window has a rectangular array of reference window portions.

13. The method of claim 12 the reference portion identified by the motion vector is the upper left reference window portion in the rectangular array.

14. The method of claim 1 wherein the compressed bitstream is an MPEG compressed bitstream and the portion is a macroblock.

15. The method of claim 13 wherein the reference window comprises a set of reference window sub-regions.

16. The method of claim 15 wherein the reference window comprises between about 8 and 128 reference window sub-regions.

17. The method of claim 16 wherein the reference window comprises between about 16 and 24 reference window sub-regions.

18. A method for recoding a compressed bitstream, the method comprising:
   determining a motion index for a frame included in the compressed bitstream;
   performing motion compensation on data for the frame when the motion index satisfies a motion compensation criteria; and
   performing re-quantization on the data for the frame when the motion index satisfies a re-quantization criteria.

19. The method of claim 18 wherein performing motion compensation comprises:
   creating a reference window comprising a set of reference window portions; and
   storing the set of reference window portions in a first memory source.

20. The method of claim 18 wherein the motion index is determined using an inner product of the motion vectors generated from two adjacent macroblocks included in a compressed frame of an MPEG compressed bitstream.

21. The method of claim 20 wherein the motion index comprises a composite of inner products generated from multiple macroblocks included in the frame.

22. The method of claim 18 wherein the compressed bitstream is an MPEG compressed bitstream.

23. The method of claim 18 wherein the motion index comprises information relating to the amount of motion in the frame.

24. The method of claim 23 wherein the motion index comprises information relating to the amount of random motion in the frame.

25. The method of claim 24 wherein the re-quantization criteria comprises a pre-determined level of random motion in the frame.

26. The method of claim 23 wherein the motion compensation criteria comprises a pre-determined level of motion in the frame.

27. The method of claim 18 wherein the re-quantization modifies the bit rate of the compressed bitstream to use an available bandwidth of a channel.

28. The method of claim 27 wherein the motion index is used to determine the re-quantization step size of video data in a frame of the compressed bitstream.

29. A method for performing motion compensation on an MPEG compressed bitstream, the method comprising:
   selecting a macroblock included in a current frame of the MPEG bitstream;
   obtaining a motion vector for the macroblock;
   locating a reference sub-region in a reference frame identified by the motion vector;
   performing motion compensation using a first memory source when the reference sub-region is stored in an on-chip memory source;
   creating a reference window comprising a set of reference window sub-regions, the set of reference window sub-regions including the reference sub-region identified by the motion vector; and
   storing the set of window sub-regions in the first memory source.

30. The method of claim 29 further comprising re-creating the reference window when the reference sub-region was stored in a second memory source.

31. The method of claim 30 wherein the second memory source is an off-chip memory source.

32. The method of claim 29 further comprising altering the reference window after motion compensation is performed.

33. The method of claim 29 wherein altering the reference window comprises changing the number of reference window sub-regions included in the set of reference window sub-regions.

34. The method of claim 33 wherein changing the number of reference window sub-regions comprises increasing the number of reference window sub-regions included in the set of reference window sub-regions when the reference sub-region is not stored in the first memory source.

35. The method of claim 29 wherein the reference window has a rectangular array of reference sub-regions.

36. The method of claim 35 the reference sub-region identified by the motion vector is the upper left reference window sub-region in the rectangular array.

37. A system for performing motion compensation on a compressed bitstream, the system comprising:
- means for selecting a portion included in a current frame of the compressed bitstream;
- means for obtaining a motion vector for the portion;
- means for locating a reference portion in a reference frame identified by the motion vector;
- means for performing motion compensation using a first memory source when the reference portion is stored in the first memory source;
- means for creating a reference window comprising a set of reference window portions, the set of reference window portions including the reference portion identified by the motion vector; and
- means for storing the set of reference window portions in the first memory source.

38. A computer readable medium including instructions for performing motion compensation on a compressed bitstream when the instructions are read by a processing device, the instructions comprising:
- instructions for receiving first compressed video data that may be displayed at a low resolution;
- instructions for obtaining a motion vector for the portion;
- instructions for locating a reference portion in a reference frame identified by the motion vector; and
- instructions for performing motion compensation using the first memory source when the reference portion is stored in the first memory source;
- instructions for creating a reference window comprising a set of reference window portions, the set of reference window portions including the reference portion identified by the motion vector; and
- instructions for storing the set of reference window portions in the first memory source.

* * * * *